(12) United States Patent
Wilkerson

(10) Patent No.: US 10,960,967 B2
(45) Date of Patent: Mar. 30, 2021

(54) WING AND FASTENING SYSTEM FOR A WING

(71) Applicant: The Boeing Company, Chicago, IL (US)

(72) Inventor: Jeffrey A. Wilkerson, Bothell, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/210,073

(22) Filed: Dec. 5, 2018

(65) Prior Publication Data

US 2019/0106195 A1    Apr. 11, 2019

Related U.S. Application Data

(62) Division of application No. 15/245,769, filed on Aug. 24, 2016, now Pat. No. 10,179,640.

(51) Int. Cl.
| | |
|---|---|
| *B64C 1/12* | (2006.01) |
| *B64C 3/26* | (2006.01) |
| *B64D 45/02* | (2006.01) |
| *F16B 5/02* | (2006.01) |
| *F16B 37/04* | (2006.01) |
| *F16B 37/14* | (2006.01) |

(Continued)

(52) U.S. Cl.
CPC .............. *B64C 3/26* (2013.01); *B64C 3/185* (2013.01); *B64D 45/02* (2013.01); *B64F 5/10* (2017.01); *F16B 5/0225* (2013.01); *F16B 37/044* (2013.01); *F16B 37/14* (2013.01)

(58) Field of Classification Search
CPC ........... B64C 1/06; B64C 1/064; B64C 1/065; B64C 1/12; B64C 3/26; B64D 45/02; F16B 5/0225; F16B 5/025
See application file for complete search history.

(56) References Cited

U.S. PATENT DOCUMENTS

| 3,646,982 A | * | 3/1972 | Cushman | .............. F16B 33/004 |
|---|---|---|---|---|
| | | | | 411/82.5 |
| 4,295,766 A | | 10/1981 | Shaw | |

(Continued)

FOREIGN PATENT DOCUMENTS

| EP | 0 269 458 | 6/1988 |
|---|---|---|
| EP | 2 551 187 | 1/2013 |
| EP | 3 000 719 | 3/2016 |

OTHER PUBLICATIONS

Canadian Intellectual Property Office, Office Action, App. No. 2,975,178 (dated Oct. 9, 2020).

*Primary Examiner* — Michael P Ferguson
(74) *Attorney, Agent, or Firm* — Walters & Wasylyna LLC

(57) ABSTRACT

A wing includes a wing box including interconnected spars, an interior system installed within the wing box, an opposed pair of skins fastened to and covering the wing box, wherein one of the skins closes out the wing, and a plurality of fastening systems configured to fasten the skins to the spars and provide protection from electromagnetic effects, wherein each one of the fastening systems includes a threaded fastener, a nut plate including a body and a cover, and a nut enclosed within the nut plate between the body and the cover, wherein the nut is restricted from rotation within the nut plate about a nut plate axis and is free to move linearly within the nut plate orthogonal to the nut plate axis.

20 Claims, 8 Drawing Sheets

(51) Int. Cl.
   *B64F 5/10*      (2017.01)
   *B64C 3/18*      (2006.01)

(56) References Cited

U.S. PATENT DOCUMENTS

| | | |
|---|---|---|
| 4,565,595 A | 1/1986 | Whitener |
| 4,830,557 A | 5/1989 | Harris et al. |
| 4,891,732 A * | 1/1990 | Jones .................... F16B 37/044 |
| | | 361/218 |
| 5,175,665 A * | 12/1992 | Pegg ...................... B64D 45/02 |
| | | 244/1 A |
| 5,245,743 A | 9/1993 | Landy et al. |
| 5,332,178 A | 7/1994 | Williams |
| 7,934,676 B2 | 5/2011 | Dufresne et al. |
| 10,179,640 B2 * | 1/2019 | Wilkerson ................ B64F 5/10 |
| 2012/0317787 A1 | 12/2012 | Ross et al. |
| 2013/0259604 A1 | 10/2013 | Whitlock et al. |
| 2014/0145032 A1 | 5/2014 | Moselage, III |
| 2014/0209744 A1 | 7/2014 | Marcoe et al. |
| 2014/0219744 A1 * | 8/2014 | Heeter ................... H01R 4/304 |
| | | 411/368 |

* cited by examiner

WING AND FASTENING SYSTEM FOR A WING

PRIORITY

This application is a divisional of U.S. Ser. No. 15/245,769 filed on Aug. 24, 2016.

FIELD

The present disclosure is generally related to wings for aircraft and, more particularly, to electromagnetic effect compliant aircraft wings and methods of manufacturing the same.

BACKGROUND

Composite structures are used in a wide variety of applications, including in the manufacture of airplanes, spacecraft, rotorcraft and other vehicles and structures, due to their high strength-to-weight ratios, corrosion resistance and other favorable properties. In the aerospace industry, composite structures are used in increasing quantities, for example, to form the wings, tail sections, fuselage and other components, due to their better specific strength and stiffness, which translates to weight savings, which translates into fuel savings and lower operating costs.

As an example, composite aircraft wings may utilize upper and lower outer composite wing skin panels, commonly referred to as "skins," that are mechanically attached or bonded to an internal frame. The internal frame may typically include reinforcing structures such as spars, ribs and/or stringers to improve the strength and stability of the skins. The skins may be attached to the spars, and the spars provide structural integrity for the wings. In addition, many aircraft wings may be used as fuel tanks (e.g., a fuel tank is defined inside the wing), which may be contained between front and rear spars.

However, composite structures in aircraft do not readily conduct away the extreme electrical currents and electromagnetic forces generated by lightning strikes. Therefore, aircraft with composite structures, such as composite wings, may be equipped with protection against electromagnetic effects (EME) from lighting strikes. For example, conductive media may be provided on a surface to dissipate lightning current away from underlying metal structures and/or fastener systems. In addition, gaps between fastener parts (e.g., two-piece fasteners) and gaps between fastener parts and structural members may be filled with dielectric sealant that provides EME protection. Even if some current is not diverted, the sealant prevents arcing and sparking across the gaps.

However, current EME protection architectures for composite wings are complex and expensive. As an example, the processes of installing the two-piece fasteners and applying the sealant requires extensive manufacturing labor and is performed in confined spaces. For example, the process of manufacturing the wing typically involves match drilling the spars and the skins, removal of the skins from the spars for surface finishing, and realignment of the skins to the spars to close out the wing. Access to the now closed out wing for installation of the fastener parts, installation of other interior systems and injection of the sealant is gained through access holes formed in the lower outer skin, which is inefficient and potentially dangerous for the laborer. Moreover, the sealant adds weight to the aircraft. While the weight added to a single fastener system might seem insignificant, applying the sealant to tens of thousands of fasteners in a single aircraft can add hundreds of pounds.

Accordingly, those skilled in the art continue with research and development efforts in the field of aircraft wings and, in particular, EME compliant wings.

SUMMARY

In one embodiment, the disclosed wing includes a wing box including interconnected spars, an interior system installed within the wing box, and an opposed pair of skins fastened to and covering the wing box, wherein one of the skins closes out the wing.

In another embodiment, the disclosed wing includes a wing box including interconnected spars or interconnected spars and ribs, an interior system installed within the wing box, an opposed pair of skins fastened to and covering the wing box, wherein one of the skins closes out the wing, and a plurality of fastening systems configured to fasten the skins to the spars and provide protection from electromagnetic effects, wherein each one of the fastening systems includes a threaded fastener, a nut plate including a body and a cover, and a nut enclosed within the nut plate between the body and the cover, wherein the nut is restricted from rotation within the nut plate about a nut plate axis and is free to move linearly within the nut plate orthogonal to the nut plate axis.

In another embodiment, the disclosed fastening system, to fasten a skin to a spar of a wing, includes a threaded fastener configured to be received through a skin fastener hole in the skin, a nut plate configured to be coupled within a spar fastener hole of the spar generally aligned with the skin fastener hole, wherein the nut plate comprises a body and a cover, and a nut enclosed within the nut plate between the body and the cover, wherein the nut is restricted from rotation within the nut plate about a nut plate axis, and the nut is free to move linearly within the nut plate orthogonal to the nut plate axis.

In yet another embodiment, the disclosed method for making a wing includes the steps of: (1) forming a wing box including interconnected spars, and a plurality of spar fastener holes formed through the spars, each one of the spar fastener holes comprising a spar fastener hole diameter, (2) forming skins comprising a plurality of skin fastener apertures, each one of the skin fastener holes comprising a skin fastener hole diameter, wherein the spar fastener hole diameter is larger than the skin fastener hole diameter, (3) installing an interior system within the wing box, (4) installing nut plates within each of the spar fastener holes, wherein each one of the nut plates includes a sleeve configured to be received and retained within an associated one of the spar fastener holes, a flange extending radially from the sleeve and defining a nut receiving recess, a dome cover extending axially from the flange opposite the sleeve and defining an interior chamber and a nut at least partially received within the nut receiving recess and enclosed within the cover, wherein the nut is restricted from rotation within the nut plate about a nut plate axis and is free to move linearly within the nut plate orthogonal to the nut plate axis, (5) sandwiching the wing box and enclosing the interior system between the skins with the skin fastener holes generally aligned with the spar fastener holes, wherein a skin fastener hole center axis of each one of the skin fastener holes is not coaxially aligned with a spar fastener hole center axis of each one of the spar fastener holes, (6) installing fasteners through each one of the skin fastener apertures and the sleeve of each one of the nut plates, (7) coaxially aligning a nut axis of the nut with the skin fastener hole center axis, (8) fastening the fasteners to the nut of the nut plates, (9) providing protection from electromagnetic effects, and (10) closing out the wing.

Other embodiments of the disclosed apparatus and method will become apparent from the following detailed description, the accompanying drawings and the appended claims.

DETAILED DESCRIPTION

Figure 1:
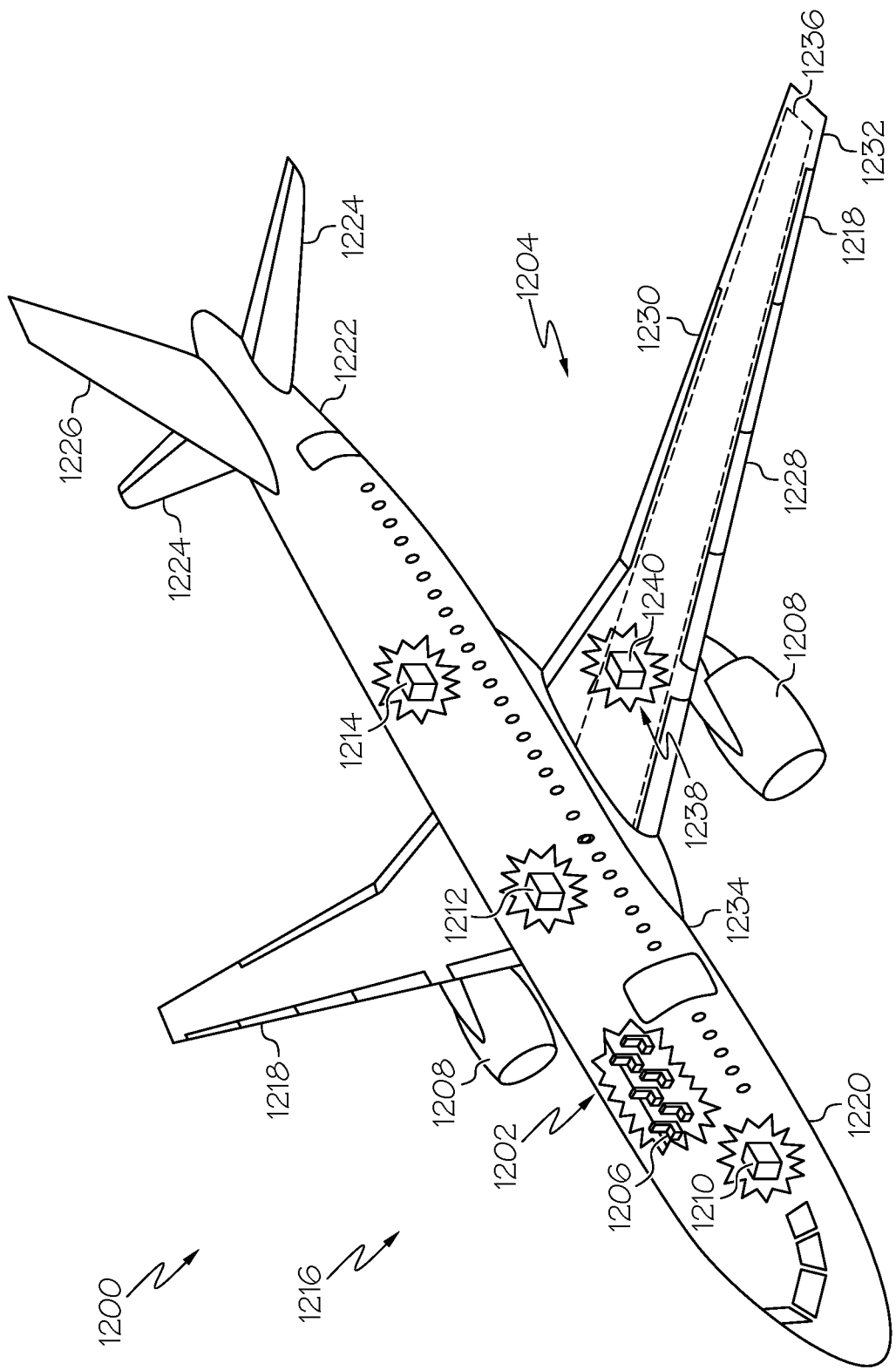
FIG. 1 is a schematic illustration of an aircraft.

The following detailed description refers to the accompanying drawings, which illustrate specific embodiments and/or examples described by the disclosure. Other embodiments and/or examples having different structures and operations do not depart from the scope of the present disclosure. Like reference numerals may refer to the same feature, element or component in the different drawings.

Illustrative, non-exhaustive embodiments, which may be, but are not necessarily, claimed, of the subject matter according the present disclosure are provided below.

FIG. 1 is a schematic illustration of an exemplary embodiment of an aircraft 1200, such as in the form of an airplane 1216 (e.g., a fixed wing aircraft). As illustrated in FIG. 1, the aircraft 1200 includes two or more wings 1218. Each wing 1218 may incorporate one or more embodiments of the disclosed wing 100 (FIG. 3) and disclosed fastener system 200 (FIG. 4). The aircraft 1200 also includes a fuselage 1220 and a tail 1222, for example, that includes horizontal stabilizers 1224 and a vertical stabilizer 1226. The wings 1218, horizontal stabilizers 1224 and/or vertical stabilizer 1226 may take the form of an airfoil (e.g., includes an airfoil-shaped body in cross-section). As further shown in FIG. 1, each wing 1218 includes a leading edge 1228, a trailing edge 1230, a tip end 1232, a root end 1234 and an internal frame 1236. Each wing 1218 may also include one or more fuel containment regions, such as a fuel tank 1240.

Figure 2:
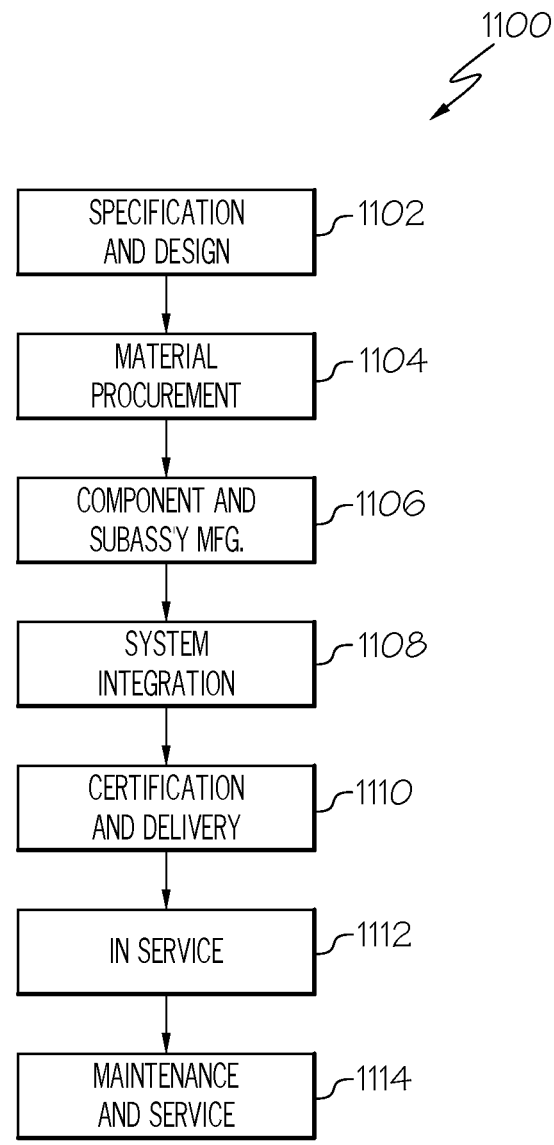
FIG. 2 is a schematic block diagram of aircraft production and service methodology.

Embodiments of the wing 100, the fastener system 200 and method 500 for making the same disclosed herein may be described in the context of an aircraft manufacturing and service method 1100, as shown in FIG. 2, and the aircraft 1200, as shown in FIG. 2.

FIG. 2 is an illustration of a flow diagram of an exemplary embodiment of the aircraft manufacturing and service method 1100. During pre-production, the illustrative method 1100 may include specification and design, as shown at block 1102, of the aircraft 1200, which may include design of the wing 100, and material procurement, as shown at block 1104. During production, component and subassembly manufacturing, as shown at block 1106, and system integration, as shown at block 1108, of the aircraft 1200 may take place. Production of the wing 100, as described herein, may be accomplished as a portion of the production, component and subassembly manufacturing step (block 1106) and/or as a portion of the system integration (block 1108). Thereafter, the aircraft 1200 may go through certification and delivery, as shown block 1110, to be placed in service, as shown at block 1112. While in service, the aircraft 1200 may be scheduled for routine maintenance and service, as shown at block 1114. Routine maintenance and service may include modification, reconfiguration, refurbishment, etc. of one or more systems of aircraft 1200 (which may also include modification, reconfiguration, refurbishment, and other suitable services).

Each of the processes of illustrative aircraft manufacturing and service method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 1, the aircraft 1200 produced by the exemplary aircraft manufacturing and service method 1100 may include an airframe 1202, a plurality of high-level systems 1204 and an interior 1206. Examples of the high-level systems 1204 include one or more of a propulsion system 1208, an electrical system 1210, a hydraulic system 1212 and an environmental system 1214. Any number of other systems may be included.

Although the aircraft 1200 shown in FIG. 1 is generally representative of a commercial passenger aircraft having wings 1218 that incorporate one or more embodiments of the disclosed wing 100, the teachings of the embodiments disclosed herein may be applied to other passenger aircraft, cargo aircraft, military aircraft, rotorcraft, and other types of aircraft or aerial vehicles, as well as aerospace vehicles, satellites, space launch vehicles, rockets, and other aerospace vehicles, as well as automobiles and other land vehicles, boats and other watercraft, structures such as windmills, or other suitable structures.

Apparatus, systems and methods embodied herein may be employed during any one or more of the stages of the aircraft manufacturing and service method 1100. For example, components or subassemblies corresponding to component and subassembly manufacturing (block 1106) may be fabricated or manufactured in a manner similar to components or subassemblies produced while aircraft 1200 is in service (block 1112). Also, one or more apparatus embodiments, method embodiments or a combination thereof may be utilized during production stages such as component and subassembly manufacturing (block 1106) and system integration (block 1108), for example, by substantially expediting assembly of and/or reducing the cost of the aircraft 1200 while complying with electromagnetic effects (EME) requirements. Similarly, one or more apparatus embodiments, method embodiments or a combination thereof may be utilized, for example and without limitation, while aircraft 1200 is in service (block 1112) and during maintenance and service stage (block 1114).

Figure 3:
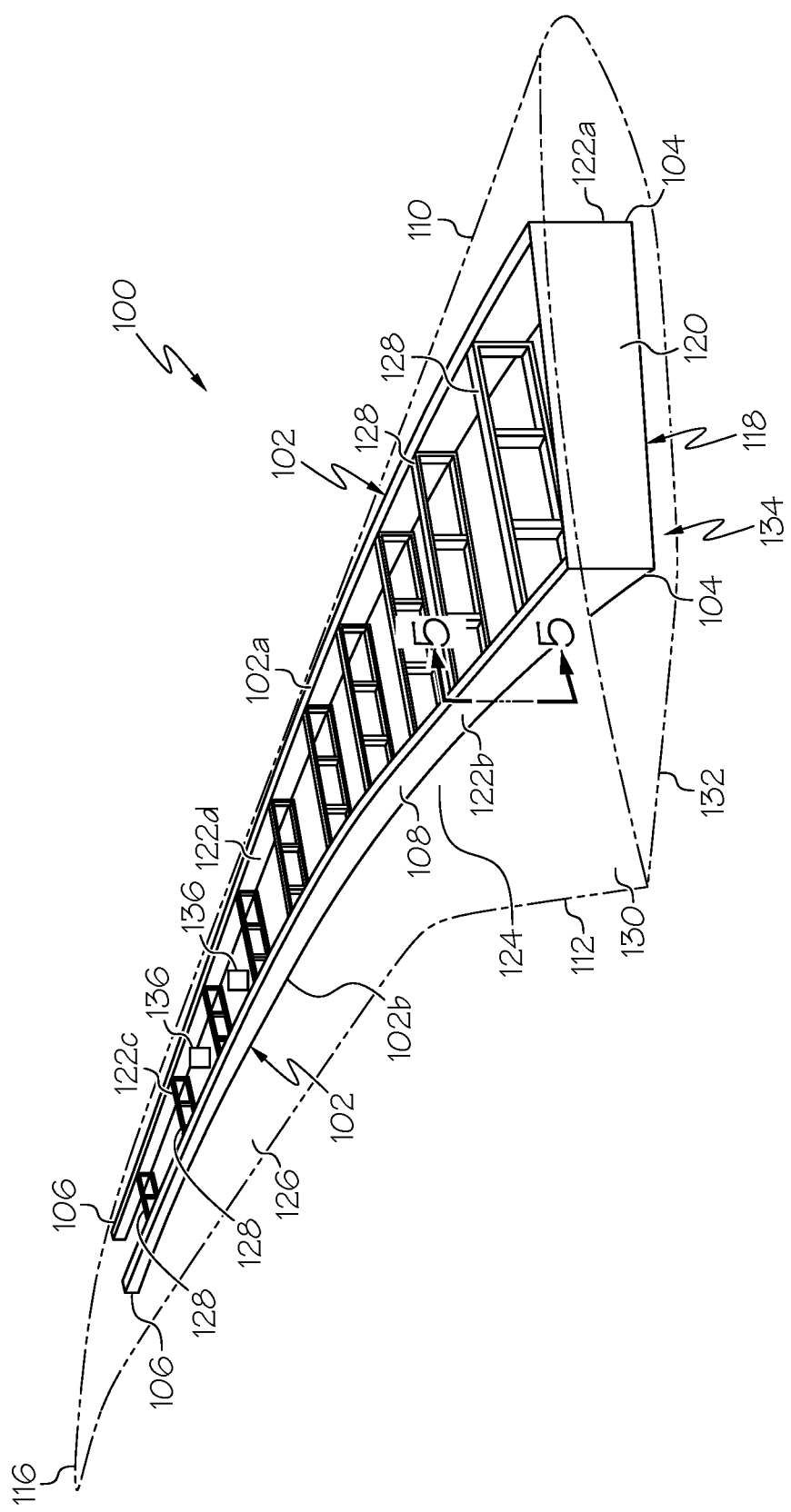
FIG. 3 is a schematic side perspective view of one embodiment of the disclosed wing.
Figure 4:
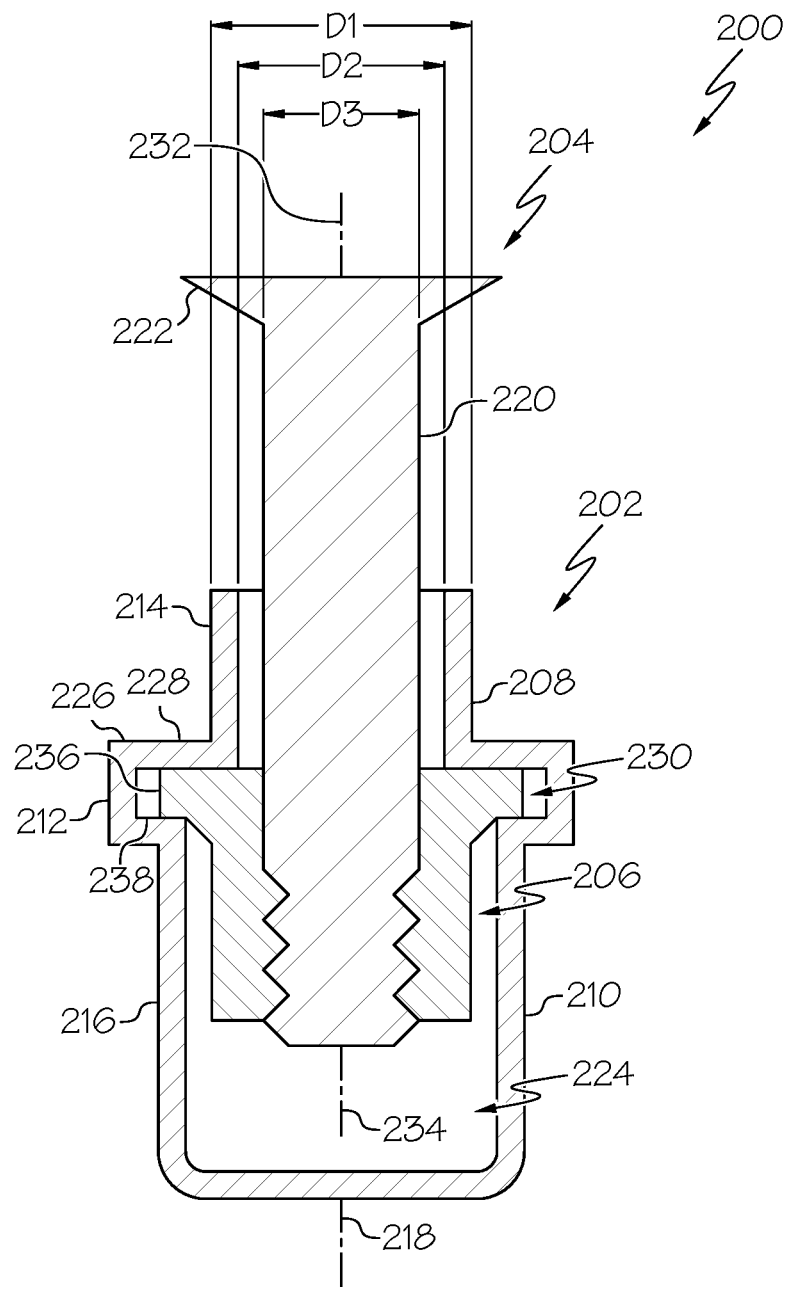
FIG. 4 is a schematic side elevation view, in section, of one embodiment of the disclosed fastener system.

FIG. 3 is a schematic illustration of a side perspective view of an exemplary embodiment of the disclosed wing 100, for example, a composite wing, such as in the form of the aircraft wing 1218 (FIG. 1). In the illustrated embodiment, the wing 100 includes one or more spars 102 and a plurality of stiffened outer wing skin panels, generally referred to as skins 130. The wing 100 may also include a plurality of ribs 128. When utilized, the ribs 128 are connected to the spars 102, for example, extending approximately perpendicularly between adjacent pairs of spars 102. The spars 102 or the spars 102 and the ribs 128 form an internal frame 134 of the wing, such as the internal frame 1236 (FIG. 1) of the aircraft wing 1218 (FIG. 1).

Each spar 102 includes a first end 104, a longitudinally opposed second end 106 and an elongated body 108. The body 108 may be continuous (e.g., unitary) body or segmented. As an example, the illustrated wing 100 includes a front spar 102a and a rear spar 102b. The front spar 102a is positioned lengthwise along a leading edge 110 of the wing 100, such as in the form of the leading edge 1228 of the aircraft wing 1218 (FIG. 1). The rear spar 102b is positioned lengthwise along a trailing edge 112 of the wing 100, such as in the form of the trailing edge 1230 of the aircraft wing 1218. As another example, the wing 100 may also include one or more intermediate spars (not explicitly illustrated). The intermediate spars are positioned lengthwise (e.g., at intermediate locations) between the front spar 102a and the rear spar 102b. The spars 102 provide strength to the wing 100 and may carry axial forces and bending moments.

In an exemplary embodiment, each one of the spars 102 may be attached to a fuselage of an aircraft, such as the fuselage 1220 (FIG. 1) of the aircraft 1200 (FIG. 1). As an example, the first end 104 of each of the spars 102 is configured for attachment to the fuselage. In other embodiments, the spars 102 may be attached to other suitable structures of the aircraft.

The spars 102 extend from the fuselage in a lengthwise direction from a root end 114 toward a tip end 116 of the wing 100, such as from the root end 1234 (FIG. 1) toward the tip end 1232 (FIG. 1) of the aircraft wing 1218 (FIG. 1). In the illustrated embodiment, the second end 106 of each of the spars 102 extends toward the tip end 116 of the wing 100 and/or terminates proximate (e.g., at or near) the tip end 116.

In the illustrated embodiment, the wing 100 includes one or more fuel containment regions 118 disposed in the wing 100, such as in the form of the fuel containment region 1238 (FIG. 1) of the aircraft wing 1218 (FIG. 1). In an exemplary embodiment, the fuel containment region 118 includes a fuel tank 120, such as in the form of the fuel tank 1240 (FIG. 1). However, in other embodiments, the fuel containment regions 118 may include a fuel cell or another suitable fuel containment region or structure.

In an example, and as shown in FIG. 3, the fuel containment region 118, such as in the form of the fuel tank 120, has fuel containment boundaries 122a, 122b, 122c, 122d that form the perimeter of the fuel containment region 118. Although the example fuel containment region 118 shown in FIG. 3 has a four-sided, generally rectangular configuration, in other examples, the fuel containment region may be formed in other suitable configurations.

In an embodiment of the wing 100, the front spar 102a and the rear spar 102b are closer to the tip end 116 than intermediate spar, which may have a second end that terminates near a middle portion of the fuel containment region 118. However, in other embodiments, the second end of the intermediate spar may terminate at longer or shorter lengths within the fuel containment region 118.

In the illustrated embodiment, the front spar 102a and the rear spar 102b extend in the lengthwise direction through both a wet section 124 of the wing 100, containing the fuel containment region 118, and through a dry section 126 of the wing 100, not containing the fuel containment region 118. As used herein, the term wet section means a fuel barrier area where fuel is contained and the term dry section means an area where no fuel is contained.

In an embodiment, portions of one or more of the spars 102 may form a structural wall of at least one of the one or more fuel containment regions 118. For example, a portion of the front spar 102a may form the structural wall of the fuel containment region 118 along the fuel containment boundary 122d. A portion of the rear spar 102b may form the structural wall of the fuel containment region 118 along the fuel containment boundary 122b. The portions of the spars 102 forming the structural wall are interior portions of the spars 102.

In the illustrated embodiment, the plurality of ribs 128 are attached substantially perpendicular to and between the one or more spars 102. As an example, each one of the plurality of ribs 128 intersects with the spars 102. The plurality of ribs 128 stabilizes and provides support to the wing 100. In an embodiment, a portion of the plurality of ribs 128 separates the one or more fuel containment regions 118 within the wing 100.

In the illustrated embodiment, the skins 130 include one or more stiffened upper outer wing skin panels, generally referred to as an upper skin 130a, and one or more stiffened lower outer wing skin panels, generally referred to as a lower skin 130b. In FIG. 3, the upper skin 130a is depicted as being transparent in order to better illustrate the internal frame 134 of the wing 100, as shown with broken lines.

The upper skin 130a and the lower skin 130b cover or sandwich the one or more fuel containment regions 118, the one or more spars 102 and the plurality of ribs 128 between the upper skin 130a and the lower skin 130b. The plurality of ribs 128 may transfer load among the spars 102 and the upper skin 130a and the lower skin 130b.

In the illustrated embodiment, the wing 100, such as in the form of the aircraft wing 1218, includes or contains a spar wing box, or simply a wing box 132, also referred to as a ladder assembly. The wing box 132 includes the internal frame 134 or substructure of the wing 100 and includes (e.g., is formed by) the interconnected spars 102 and ribs 128. The wing box 132 may include the fuel containment region 118. The upper skin 130a and the lower skin 130b cover or sandwich the wing box 132; thus, closing out the wing box 132.

As an example embodiment, the spars 102 (e.g., the front spar 102a, the rear spar 102b and/or any intermediate spars) may be made (e.g., formed) of a composite material. As an example, the spars 102 may be made of fiber-reinforced polymer, or fiber-reinforced plastic, that includes a polymer matrix reinforced with fibers, such as carbon fiber reinforced polymer (CFRP), glass fiber reinforced polymer (GFRP) and the like. As another example embodiment, the spars 102 may be made of metal, such as aluminum, or metal allow, such as aluminum alloy. In other embodiments, the spars 102 may also be made of another suitable material or combination of materials.

As an example embodiment, the ribs 128 may be made of a composite material. As an example, the ribs 128 may be made of fiber-reinforced polymer that includes a polymer matrix reinforced with fibers, such as carbon fiber reinforced polymer CFRP, GFRP and the like. As another example embodiment, the ribs 128 may be made of metal, such as aluminum, or metal allow, such as aluminum alloy. In other embodiments, the ribs 128 may also be made of another suitable material or combination of materials.

Thus, in an example embodiment, the wing box 132 (e.g., the spars 102 or the spars 102 and the ribs 128 forming the internal frame 134 of the wing 100) may be made of metal, or metal alloy. In another example embodiment, the wing box 132 may be made of composite material. In yet another example embodiment, the wing box 132 may be made of a combination of metal and composite material. The wing box 132 forms the internal substructure of the wing 100, such as in the form of the aircraft wing 1218 (FIG. 1).

While the illustrative embodiment of the wing 100 shown in FIG. 3 depicts the wing box 132 as being constructed from spars 102 and ribs 128 (e.g., the wing box 132 includes interconnected spars 102 and ribs 128), those skilled in the art will recognize that in other embodiments of the wing 100, the wing box 132 may be a multi-spar design formed from only the plurality of spars 102 (e.g., the wing box 132 includes interconnected spars 102).

As an example embodiment, the skins 130 (e.g., the upper skin 130 and/or the lower skin 130b) may be made of a composite material. As an example, the skins 130 may be made of fiber-reinforced polymer that includes a polymer matrix reinforced with fibers, such as carbon fiber reinforced polymer CFRP, GFRP and the like. As another example embodiment, the skins 130 may be made of metal, such as aluminum, or metal allow, such as aluminum alloy. In other embodiments, the skins 130 may also be made of another suitable material or combination of materials.

Thus, in an example embodiment, the disclosed wing 100 (e.g., the wing box 132 and skins 130), such as in the form of the aircraft wing 1218 (FIG. 1), may be made of composite material. In another example embodiment, the disclosed wing 100 may be made of metal. In yet another example embodiment, the wing 100 may be made of a combination of metal and composite material.

In an example embodiment, the polymer matrix of the fiber-reinforced polymer, or fiber-reinforced plastic, (e.g., the resin material system of the composite material) used to make the spars 102, the ribs 128 and/or the skins 130 may be a thermoplastic resin. The present disclosure recognizes that the use of a thermoplastic resin may provide for advantageous embodiments because the thermoplastic resin may allow the composite material to be heated and reformed outside of an oven or autoclave. In another example embodiment, the polymer matrix of the fiber-reinforced polymer, or fiber-reinforced plastic, used to make the spars 102, the ribs 128 and/or the skins 130 may be a thermoset resin. In yet another example, the polymer matrix of the fiber-reinforced polymer, or fiber-reinforced plastic, used to make the spars 102, the ribs 128 and/or the skins 130 may be an epoxy resin.

Depending upon the materials used to make the spars 102 and the ribs 128, the wing box 132 may be constructed according to various different methodologies. In the various embodiments, the spars 102 and the ribs 128 are coupled together to form the wing box 132 forming the internal frame 134 of the wing 100, such as in the form of the aircraft wing 1218 (FIG. 1). In an example embodiment, the spars 102 and the ribs 128 may be connected together, for example, with mechanical fasteners, to form the wing box 132. In another example embodiment, the spars 102 and the ribs 128 may be bonded together, for example, with an adhesive, to form the wing box 132. In another example embodiment, the spars 102 and the ribs 128 may be both adhesively bonded and mechanically connected together to form the wing box 132. In another example embodiment, the spars 102 and the ribs 128 may be secondary bonded together to form the wing box 132. In another example embodiment, the spars 102 and the ribs 128 may be co-bonded together to form the wing box 132. In another example embodiment, the spars 102 and the ribs 128 may be co-cured to form the wing box 132. In yet another example embodiment, the spars 102 and the ribs 128 may be further mechanically connected together (e.g., with fasteners) when secondary bonded, co-bonded or co-cured to form the wing box 132.

As an example, in embodiments where the spars 102 and the ribs 128 are made of metal or a combination of metal and composite material, the spars 102 and the ribs 128 may be joined together using mechanical fasteners, adhesives (e.g., metal bonding) or a combination of mechanical fasteners and adhesives.

As another example, in embodiments where the spars 102 and the ribs 128 are made of composite material, the spars 102 and the ribs 128 may be secondary bonded together. As used herein, secondary bonding includes the joining together, by the process of adhesive bonding, pre-cured spars 102 and pre-cured ribs 128.

As another example, in embodiments where the spars 102 and the ribs 128 are made of composite material, the spars 102 and the ribs 128 may be co-bonded together. As used herein, co-bonding includes the curing together of the spars 102 and the ribs 128 where one of the spars 102 and the ribs 128 is fully cured and the other one of the spars 102 and the ribs 128 is uncured.

As yet another example, in embodiments where the spars 102 and the ribs 128 are made of composite material, the spars 102 and the ribs 128 may be co-cured together. As used herein, co-curing includes the curing together and simultaneous bonding of the spars 102 and the ribs 128 where the spars 102 and the ribs 128 are uncured.

Depending upon the materials used to make the spars 102, the ribs 128 and the skins 130, the wing 100 may be constructed according to various different methodologies. In the various embodiments, the skins 130 are coupled to wing box 132 to form the wing 100, such as in the form of the aircraft wing 1218 (FIG. 1). As an example, the skins 130 (e.g., one or both of the upper skin 130a and/or lower skin 130b) are coupled to the spars 102 (e.g., one or more of the front spar 102a, the rear spar 102b and/or any intermediate spars). In an example embodiment, the skins 130 may be connected to the spars 102, for example, the mechanical fasteners, to form the wing 100. In another example embodiment, the skins 130 may be bonded to the spars 102, for example, with an adhesive, to form the wing 100. In another example, the skins 130 may be both adhesively bonded and mechanically connected to the spars 102 to form the wing 100. In another example embodiment, the skins 130 and the wing box 132 (e.g., the spars 102 and the ribs 128) may be secondary bonded together to form the wing 100. In another example embodiment, the skins 130 and the wing box 132 may be co-bonded together to form the wing 100. In another example embodiment, the skins 130 and the wing box 132 may be co-cured to form the wing 100. In yet another example embodiment, the skins 130 and the wing box 132 may be further mechanically connected together (e.g., with fasteners) when secondary bonded, co-bonded or co-cured to form the wing 100.

As an example, in embodiments where the wing box 132 (e.g., the spars 102 and the ribs 128) are made of metal or a combination of metal and composite material and the skins 130 are made of composite material, the skins 130 and the wing box 132 may be joined together using mechanical fasteners, adhesives or a combination of mechanical fasteners and adhesives.

As another example, in embodiments where the skins 130 and the wing box 132 (e.g., the spars 102 and the ribs 128) are made of composite material, the skins 103 and the wing box 132 may be secondary bonded together. As used herein, secondary bonding includes the joining together, by the process of adhesive bonding, pre-cured skins 130 and a pre-cured wing box 132.

As another example, in embodiments where the skins 130 and the wing box 132 are made of composite material, the skins 130 and the wing box may be co-bonded together. As used herein, co-bonding includes the curing together of the skins 130 and the wing box 132 where one of the skins 130 and the wing box 132 is fully cured and the other one of the skins 130 and the wing box 132 is uncured. The present disclosure recognizes that co-bonding the skins 130 and the wing box 132 may provide for advantageous embodiments because co-bonding the skins 130 and the wing box 132 (e.g., the skins 130 and the spars 102) may form a substantially unitary (e.g., one part) wing 100 and may allow for elimination of the time consuming and expensive process of surface interface inspections and installation of shims to fill gaps (e.g., greater than 0.005 inch) between mating surfaces of the skins 130 and the wing box 132.

As yet another example, in embodiments where the skins 130 and the wing box 132 are made of composite material, the skins 130 and the wing box 132 may be co-cured together. As used herein, co-curing includes the curing together and simultaneous bonding of the skins 130 and the wing box 132 where the skins 130 and the wing box 132 are uncured. The present disclosure recognizes that co-curing the skins 130 and the wing box 132 may provide for advantageous embodiments because co-curing the skins 130 and the wing box 132 (e.g., the skins 130 and the spars 102) may form a substantially unitary (e.g., one part) wing 100 and may allow for elimination of the time consuming and expensive process of surface interface inspections and installation of shims to fill gaps (e.g., greater than 0.005 inch) between mating surfaces of the skins 130 and the wing box 132.

In embodiments where the skins 130 and the wing box 132 are made of composite material, individual components of the wing 100 (e.g., the spars 102, the ribs 128 and/or the skins 130) or the wing 100 as a whole may be formed according to various composite layup methodologies. As an example, the individual components of the wing 100 or the wing 100 as a whole may be formed as a dry layup in which a plurality of sheets or plies of reinforcing fibrous material each of which being pre-impregnated with the polymer matrix material (e.g., a pre-preg tape) is laid up, for example, in a mold, and partially or fully cured. As another example, the individual components of the wing 100 or the wing 100 as a whole may be formed as a wet layup in which a plurality of sheets or plies of reinforcing fibrous material is laid up, for example, in a mold, and the polymer matrix material is applied to (e.g., infused within) the sheets or plies of reinforcing fibrous material and partially or fully cured. The present disclosure recognizes that the use of the wet layup process may provide for advantageous embodiments because the wet layup process may allow the individual components of the wing 100 or the wing 100 as a whole to be made at a reduced material and processing cost.

In the various embodiments of the wing 100 disclosed herein, such as in the form of the aircraft wing 1218 (FIG. 1), the skins 130 are used to close out the wing 100. As used herein, the terms "close out," "closed out" and similar terms refer to a manufacturing methodology, process or condition of the wing 100 in which the wing box 132 and any interior systems 136 are completely enclosed or sandwiched between the opposed skins 130 (e.g., the upper skin 130a and the lower skin 130b). In other words, a three-dimensional structure is closed out by installing a final part or component to completely enclose and form the structure. For example, in the case of the wing 100, five of the six sides of the wing 100 are installed, for example formed by the wing box 132 and a skin 130. When the final side is installed, for example, formed by the opposed skin 130, the wing 100 is "closed out." Examples of the interior systems 136 include, but are not limited to, electrical systems, hydraulic systems, fuel systems, pumps, valves, fluid tubing systems and the like. As such, the interior systems 138 are commonly referred to as stuffed system, because the wing box 132 is filled, or stuffed, with the interior systems 138.

Thus, once the skins 130 are coupled to and close out the wing box 132, final assembly of any interior components of the wing 100 is complete. Further, use of the disclosed fastener system 200 allows the skins 130 to be fastened to the wing box 132 following close out. The present disclosure recognizes that using the skins 130 to close out the wing box 132 may provide for advantageous embodiments because using the skins 130 to close out the wing box 132 may allow for open system installation and EME protection, which eliminates the complex, expensive and labor intensive process of installation of fastener parts, installation of the interior systems 136 and injection of EME protective sealant through access holes formed in the lower outer skin.

As an example, in embodiments where the skins 130 and the wing box 132 are both made of composite materials and are co-bonded or co-cured, the lower skin 130b and the wing box 132 may be co-bonded or co-cured together to form a cured component (e.g., a pre-cursor composite wing). A release agent may be used between the lower skin 130b and the wing box 132 to enable removal of the lower skin 130b following the co-bonding or co-curing process. The interior systems 136 are installed within the open wing box 132 (via open systems installation) provides by the lack of the upper skin 130a and/or removal of the lower skin 130b. If temporarily removed, the lower skin 130b is then recoupled to the wing box 132. The upper skin 130a is then coupled to the pre-cursor composite wing (e.g., the wing box 132 with the recoupled lower skin 130b). As an example, the upper skin 130a may be an uncured component in which the cured pre-cursor composite wing and the uncured upper skin 130a are co-bonded to form the wing 100. As another example, the upper skin 130a is a cured component in which the cured pre-cursor composite wing and the cured upper skin 130a are secondary bonded and/or mechanically connected (e.g., using fasteners) together to form the wing 100. This process may be referred to as a three-quarter co-cure.

As an example, in embodiments where the skins 130 and the wing box 132 are both made of composite materials and are co-bonded or co-cured, the upper skin 130a, the lower skin 130b and the wing box 132 may be co-bonded or co-cured together to form a cured component (e.g., the wing 100). A release agent may be used between the upper skin 130a and the wing box 132 to enable removal of the upper skin 130a following the co-bonding or co-curing process. Similarly, a release agent may be used between the lower skin 130b and the wing box 132 to enable removal of the lower skin 130b following the co-bonding or co-curing process. After removal of one or both of the upper skin 130a and/or the lower skin 130b, the interior systems 136 are installed within the open wing box 132 (via open systems installation) due to the lack of the upper skin 130a. The upper skin 130a and/or the lower skin 130b are then recoupled to the composite wing. This process may be referred to as a full co-cure.

FIG. 4 is a schematic illustration of a cross-sectional side elevation view of an exemplary embodiment of the disclosed fastener system 200. In the various embodiments of the wing 100 (FIG. 3) described herein, such as in the form of the aircraft wing 1218 (FIG. 1), a plurality of fastener systems 200 are used to further couple the skins 130 (FIG. 3) to the wing box 132 (FIG. 3). As an example, a plurality of fastener systems 200 are used to further couple (e.g., mechanically connect) one or more of the upper skin 130a and/or the lower skin 130b (FIG. 3) to the one or more spars 102 (FIG. 3).

The fastener system 200 is a two-part system. In the illustrated embodiment, the fastener system 200 includes a nut plate 202 and a fastener 204. The fastener system 200 also includes a nut 206 disposed within the nut plate 202.

In an exemplary embodiment, the nut plate 202 includes a body 208 and a cover 210. In an exemplary embodiment, the nut plate 202 (e.g., the body 208 and the cover 210) is made of metal. As a specific, non-limiting example, the nut plate 202 is made of an anti-corrosive metal such as stainless steel, zinc-plated steel, aluminum, titanium, copper nickel alloy, copper beryllium alloy and the like. As another specific, non-limiting example, the nut plate 202 may be coated with an anti-corrosive coating, such as a barrier coating or a sacrificial coating.

The nut plate 202 includes a central nut plate axis 218. The body 208 and the cover 210 are coaxial to one another along the nut plate axis 218. In an example embodiment, the body 208 and the cover 210 are separate and discrete components that are connected together. As an example, interfacing or joining edges of the body 208 and the cover 210 may be crimped together to form the nut plate 202. In another example embodiment, the body 208 and the cover 210 form a unitary (one-piece) member. As an example, and as described in more detail below, the nut plate 202 may be an additively manufactured component.

In the illustrated embodiment, the body 208 includes a flange 212 and a sleeve 214. The sleeve 214 includes a tubular member (e.g., a hollow cylindrical member). The flange 212 includes a circular member that extends radially outward from the sleeve 214 and forms an exterior shoulder 226 perpendicular to the sleeve 214. The sleeve 214 extends axially from the flange 212 along the nut plate axis 218.

In the illustrated embodiment, the cover 210 includes a dome 216. The dome 216 defines a hollow interior chamber 224 (e.g., an air chamber). The dome 216 extends axially from the flange 212 along the nut plate axis 218 opposite the sleeve 214.

In the illustrated embodiment, the fastener 204 includes a shank 220, a head 222 disposed at an end of the shank 220 and a fastener axis 232. In an example, at least a portion of the shank 220 includes a smooth exterior surface, for example, proximate (e.g., at or near) the head 222, and at least a portion of the shank 220 includes an exterior thread, for example, covering a portion of the shank 220 proximate the other end of the shank 220 opposite the head 222. The threaded portion of the shank 220 is configured to threadingly connect to the nut 206 in order to fasten the fastener 204 and the nut 206 together.

In the illustrated embodiment, the nut plate 202 is configured to restrict (e.g., prevent) rotational movement of the nut 206 about the nut plate axis 218. As an example, the nut plate 202 fixes a rotational position of the nut 206 relative to the nut plate 202 such that the nut 206 remains fixed (e.g., does not rotate about the nut plate axis 218) in response to engagement and rotational movement of the fastener 204, about the fastener axis 232, to allow the fastener 204 to be fastened (e.g., threadingly connected) to the nut 206.

In the illustrated embodiment, the sleeve 214 includes a sleeve outside diameter D1 and a sleeve inside diameter D2. The sleeve inside diameter D2 of the sleeve 214 is larger than the shank diameter D3 of the shank 220 of the fastener 204. As an example, the sleeve inside diameter D2 of the sleeve 214 being larger than the shank diameter D3 of the shank 220 allows the fastener 204 to be inserted into and through the sleeve 214 in positions where the fastener axis 232 is not coaxially aligned with the nut plate axis 218. The difference between the sleeve inside diameter D2 of the sleeve 214 and the shank diameter D3 of the shank 220 defines the positional tolerance allowance for alignment of the skin fastener hole 144 and the spar fastener hole 142. The particular dimensions of the sleeve inside diameter D2 of the sleeve 214 and the shank diameter D3 of the shank 220 of the fastener 204 may vary depending upon implementation. As a specific, non-limiting example, the shank diameter D3 of the fastener 204 may be approximately 0.003 inch and the sleeve inside diameter D2 of the sleeve 214 may be approximately 0.006 inch; thus, providing a 0.003 inch radial float in any direction for alignment of the skin fastener hole 144 and the spar fastener hole 142 when coupling the skin 130 to the spar 102.

Further, in the illustrated embodiment, the nut plate 202 is also configured to allow for linear movement of the nut 206 orthogonal to the nut plate axis 218. As an example, the nut plate 202 allows the nut 206 to freely move (e.g., to float) in any linear direction relative to the nut plate 202 perpendicular to the nut plate axis 218. The free orthogonal movement of the nut 206 allows a central nut axis 234 of the nut 206 to be coaxially aligned with the fastener axis 232 and mating engagement of the fastener 204 and nut 206, when the fastener 204 is positioned within the sleeve 214 and the fastener axis 232 is not coaxially aligned with the nut plate axis 218.

In the illustrated embodiment, the nut 206 is disposed at least partially within the body 208 and at least partially within the cover 210. The body 208 and the cover 210 completely enclose and seal the nut 206 within the nut plate 202, for example, to protect the nut 206 and the fastening interface from contamination, such as fuel stored within the fuel containment region 118 (FIG. 3). In an example embodiment, the nut 206 includes a collar 236 that extends radially outward. In this example embodiment, the flange 212 of the body 208 includes interior walls that define a nut receiving recess 230 configured to accommodate and at least partially receive the collar 236 of the nut 206. A portion of the nut 206 extending axially from the collar 236 along the nut axis 234 may be disposed within the dome 216 of the cover 210.

Figure 6:
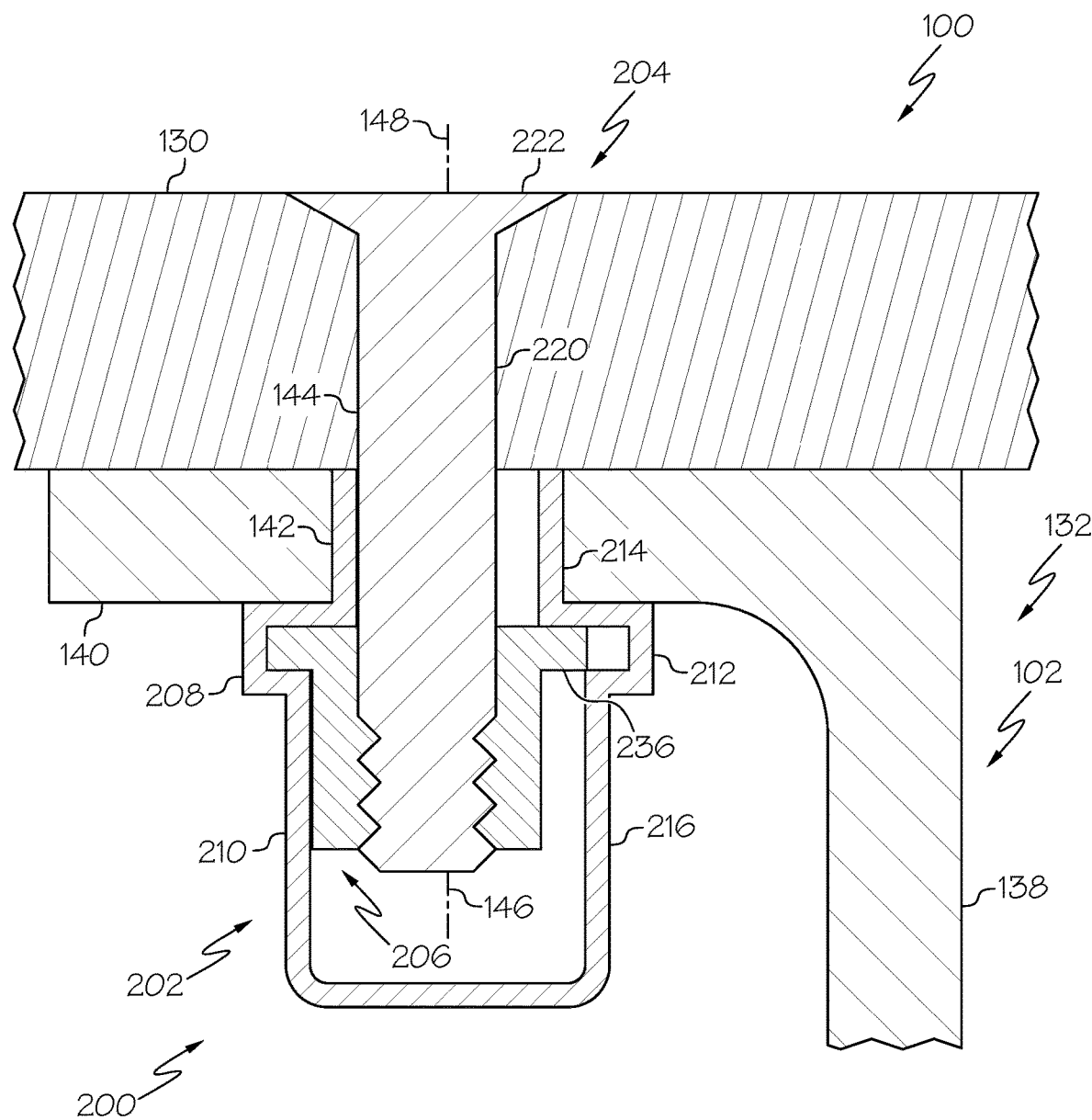
FIG. 6 is a schematic partial side elevation view, in section, of another embodiment of the disclosed wing and fastener system.

FIG. 6 is a schematic illustration of a partial cross-sectional view of another embodiment of the disclosed wing 100, such as in the form of the aircraft wing 1218 (FIG. 1), and the disclosed fastener system 200. In the illustrated embodiment, the flange 212 forms an interior shoulder, or seat, 238 and a rim 260 at least partially defining the nut receiving recess 230. The interior shoulder 238 of the flange 212 supports the collar 236 of the nut 206. In an example, the nut receiving recess 230 (e.g., the interior surface of the flange 212) may have an interior geometric shape matching an exterior geometric shape of the collar 236, such as a hexagon, in order to prevent rotation of the nut 206 within the flange 212. In another example, the collar 236 may include a wing or other protrusion that engages a portion of the interior surface of the flange 212 in order to prevent rotation of the nut 206 within the flange 212. In other examples, the interior of the flange 212 and/or the collar 236 of the nut 206 may have other features that prevent rotation of the nut 206 within the flange 212.

Figure 5:
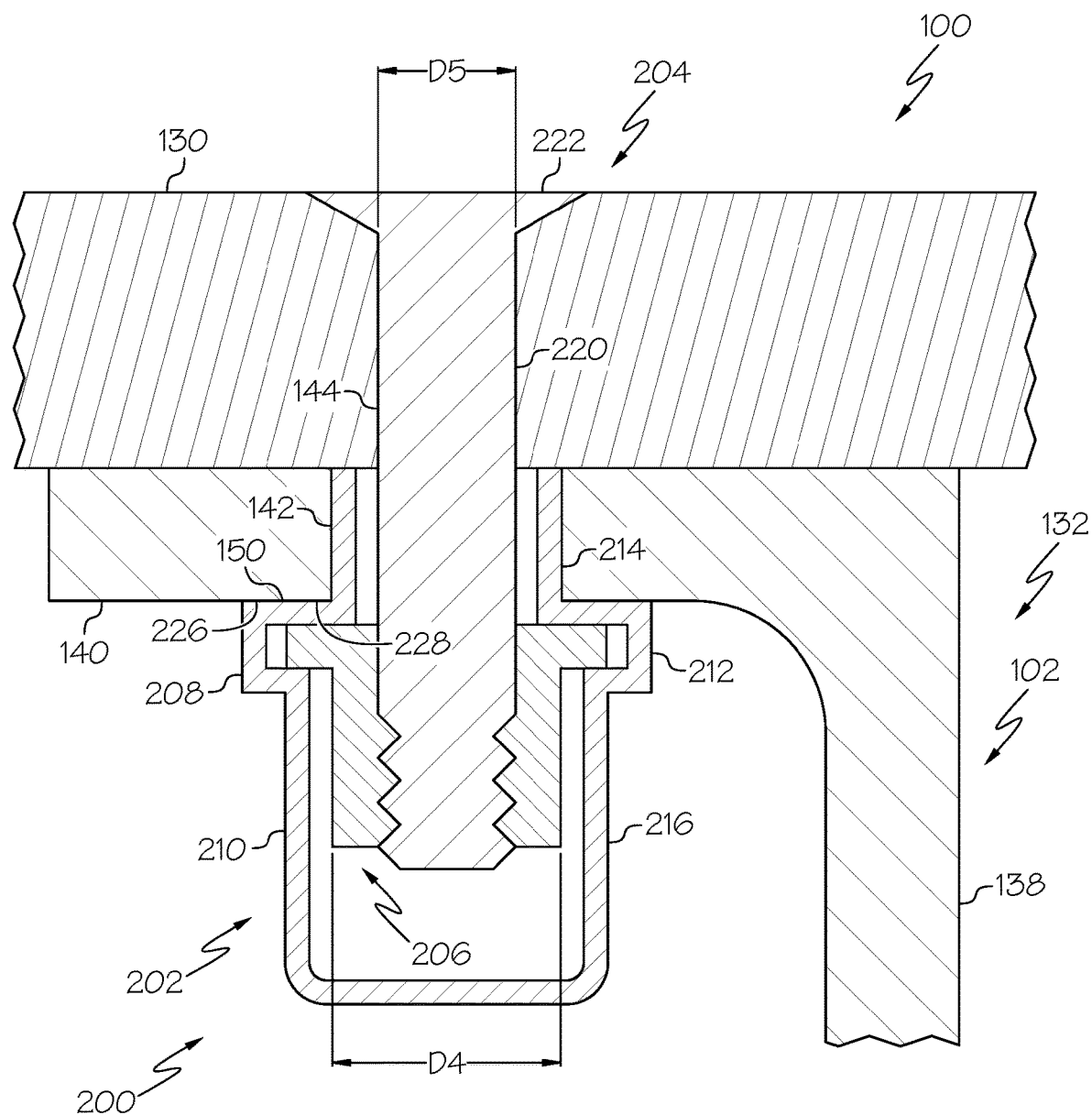
FIG. 5 is a schematic partial side elevation view, in section, of one embodiment of the disclosed wing and fastener system.

FIG. 5 is a schematic illustration of a partial cross-sectional view of an exemplary embodiment of the disclosed wing 100, such as in the form of the aircraft wing 1218 (FIG. 1), and the disclosed fastener system 200, for example, along lines 5-5 of FIG. 3. In the illustrated embodiment, the fastener system 200 is used to fasten the skin 130 to the wing box 132, for example, the spars 102.

In the illustrative embodiment, each of the one or more spars 102 (e.g., the front spar 102*a*, the rear spar 102*b* and/or any intermediate spars) (FIG. 3) may be a C-channel spar having a C-shaped cross section. The C-shaped cross section of the spars 102 may vary along the length of the spars 102. Only one end (e.g., an upper end) portion of the C-channel spar is illustrated in FIG. 5. Those skilled in the art will recognize that in other embodiments, one or more of the spars 102 may have other cross-sectional shapes, such as L-shaped spars, T-shaped spars and the like. The spar 102 includes a web portion 138 disposed between an opposed pair of chords 140, for example, a first (e.g., upper) chord 140 and an opposed second (e.g., lower) chord 140. In this example embodiment, the C-channel spar 102 has a unitary configuration through its entire cross-section. The chords 140 of the spar 102 are configured to be joined to the skins 130. As an example, the upper chord 140 is configured to be joined to the upper skin 130*a* (FIG. 3) and the lower chord 140 is configured to the joined to the lower skin 130*b* (FIG. 3). Only one (e.g., the upper) chord 140 joined to one (e.g., the upper) skin 130 is illustrated in FIG. 5.

In the illustrative embodiment, the spar 102 includes a spar fastener hole 142 formed (e.g., drilled or otherwise machined) through the chord 140. The spar fastener hole 142 is configured to accommodate (e.g., receive) the nut plate 202. For example, the spar fastener hole 142 is configured to accommodate (e.g., receive) the sleeve 214. The exterior shoulder 226 of the flange 212 defines a flange contact surface 228 configured to be placed in intimate contact with a portion of a first surface 150 of the spar 102, for example, proximate (e.g., at or near) a perimeter of the spar fastener hole 142, when the sleeve 214 is inserted into the spar fastener hole 142. In this embodiment, the surface 150 of the spar 102 and the flange contact surface 228 define a flange-to-spar interface 254. Similarly, the skin 130 includes a skin fastener hole 144 formed therethrough. The skin fastener hole 144 is configured to accommodate (e.g., receive) the fastener 204. The spar fastener hole 142 and the skin fastener hole 144 are configured to be approximately aligned to accommodate installation of the fastener system 200 in order to connect the skin 130 to the spar 102.

In other embodiments, one or more of the ribs 128 may also include one or more rib fastener holes (not explicitly illustrated) formed (e.g., drilled or otherwise machined) through the rib 128. The rib fastener hole may be substantially similar to the spar fastener hole 142, as disclosed herein, in form, structure and function. As an example, the rib fastener hole is configured to accommodate (e.g., receive) the nut plate 202. The flange contact surface 228 is configured to be placed in intimate contact with a portion of a surface of the rib 128, for example, proximate (e.g., at or near) a perimeter of the rib fastener hole, when the sleeve 214 is inserted into the rib fastener hole.

The present disclosure recognizes that the disclosed fastening system 200 may provide for advantageous embodiments because the free floating nut 206 (e.g., freely moveable orthogonal to the nut plate axis 218) (FIG. 4) may allow for determinate, or determinant, assembly (DA) of the wing 100; thus, eliminating the time consuming, complex and costly process of fixture assembly of the wing 100. Fixture assembly of the wing 100 may include a match-drilling process that requires the wing box 132 and the skins 130 to be assembled in a fixture, fastener holes to be drilled through both the spars 102 and the skins 130, the skins 130 and the wing box 132 to be pulled apart, the skins 130 and the wing box 132 to be deburred or otherwise surface finished, the skins 130 and the wing box 132 to be reassembled, and the fasteners to be fastened. Determinate assembly is a process that allows for quicker, simpler and less costly assembly of the wing 100 by using fastener holes formed in the skins 130 and the spars 102, for example, that are pre-drilled based on a pattern, to quickly align the skins 130 and the spars 102 without the use of additional tooling to aid with alignment.

In an example embodiment, the spar fastener holes 142 may be pre-drilled through the chords 140 of the spars 102 and the skin fastener holes 144 may be pre-drilled through the skins 130. One or both of the spar fastener holes 142 and the skin fastener holes 144 may be full size holes, for example, not needing any further drilling during construction of the wing 100. The spar fastener holes 142 include a spar fastener hole diameter D4 and the skin fastener holes 144 include a skin fastener hold diameter D5. In the illustrated embodiment, the spar fastener hole diameter D4 of the spar fastener holes 142 is larger than the skin fastener hole diameter D5 of the skin fastener holes 144. The spar fastener hole diameter D4 of the spar fastener holes 142 is approximately equal to the sleeve outside diameter D1 (FIG. 4) of the sleeve 214. The skin fastener hole diameter D5 of the skin fastener holes 144 is approximately equal to the shank diameter D3 (FIG. 4) of the fastener 204.

The present disclosure recognizes that the disclosed wing 100 may provide for advantageous embodiments because the spar fastener hole diameter D4 of the spar fastener holes 142 being larger than the skin fastener hole diameter D5 of the skin fastener holes 144 may allow for the skins 130 to be fastened to the spars 102 without coaxial alignment of the center axes of the spar fastener holes 142 and the skin fastener holes 144 using the disclosed fastener system 200, which may allow the fastener 204 to be fastened to the nut 206 without coaxial alignment of the nut plate axis 218 (FIG. 4) and the fastener axis 232 (FIG. 4). As illustrated in FIG. 6, the nut 206 moved within the nut plate 202 orthogonal to the nut plate axis 218 (FIG. 4) to coaxially align with the fastener axis 232 (FIG. 4) and the skin fastener hole center axis 148 and allow the fastener 204 to be fastened to the nut 206.

Referring to FIG. 6, in the illustrated embodiment, upon assembly of the skin 130 to the spar 102, a spar fastener hole center axis 146 of the spar fastener hole 142 and a skin fastener hole center axis 148 of the skin fastener hole 144 are not coaxially aligned. Upon installation of the fastener 204 through the skin fastener hole 144 and through the sleeve 214 of the nut plate 202, the fastener 204 engages the nut 206 and the nut 206 moves linearly to align the nut axis 234 (FIG. 4) and the fastener axis 232 (FIG. 4) and, also the skin fastener hole center axis 148 to receive the threaded end of the shank 220. In an example, the end of the fastener 204 may include a lead-in chamfer to guide the fastener 204 into the nut 206 and/or position the nut 206 relative to the nut plate 202.

Accordingly, the disclosed fastener system 200 accounts for misalignment of the spar fastener holes 142 and the skin fastener holes 144 that may potentially occur using the determinate assembly process. The fastener system 200 enables the skin 130 to be fastened to the spar 102 with the spar fastener holes 142 and the skin fastener holes 144 not being coaxially aligned. Once the fastener system 200 is installed, the clamp force created by the fastener system 200 prevents any movement between the skin 130 and the spar 102 due to the spar fastener hole 142 and the sleeve inside diameter D2 (FIG. 4) being greater than the shank diameter D3 (FIG. 4) of the fastener 204.

Referring now to FIGS. 5 and 6, the nut plate 202 is configured to be coupled to the spar 102, for example, to the chord 140 of the spar 102, at a fixed position with the sleeve 214 received within the spar fastener hole 142. The nut plate 202 approximately positions the nut 206 relative to the spar fastener hole 142 and the skin fastener hole 144 in a suitable position for engagement with the end of the fastener 204. As described above, the nut plate 202 restricts rotational movement of the nut 206 and permits orthogonal movement of the nut 206 in order to fasten the fastener 204 to the nut 206.

The nut plate 202 may be coupled to the spar 102 by various different techniques. In an exemplary embodiment, the nut plate 202 is coupled to the spar 102 using a cold expansion, or cold working, process. As an example, prior to installation of the nut plate 202, the sleeve outside diameter D1 of the sleeve 214 is less than the spar fastener hole diameter D4 of the spar fastener hole 142. In an example operation, after the sleeve 214 is received within the spar fastener hole 142, a pull gun (not shown) is operated to extend a mandrel (not shown) through the sleeve 214 so that a head end of the mandrel extends outwardly beyond an outer end of the sleeve 214. The diameter of the head end of the mandrel plus the thickness of the sleeve 214 is approximately equal to the spar fastener hole diameter D4 of the spar fastener hole 142. The mandrel is then retracted to deform the sleeve 214 and increase the sleeve outside diameter D1 of the sleeve 214 (e.g., cold expansion) to be approximately equal to or greater than the spar fastener hole diameter D4 of the spar fastener hole 142 to hold the nut plate 202 in place relative to the spar 102. The sleeve 214 is retained within the spar fastener hole 142 by circumferential tension about the spar fastener hole 142. In an example implementation, the nut 208 includes a counterbore that is configured to allow the mandrel to go fully through the sleeve 214 of the nut plate 202 in order to expand the sleeve 214 without interference from the nut 208. The present disclosure recognizes that the disclosed fastener system 200 may provide for advantageous embodiments because expansion of the sleeve 214 by the cold working process may work harden the sleeve 214 and provide improved fatigue and durability to the nut plate 202 and/or the spar 102, for example, when the spar 102 is made of metal.

In another example embodiment, the nut plate 202 may be adhesively bonded to the spar 102 with the sleeve 214 positioned within the spar fastener hole 142. In yet another example embodiment, the nut plate 202 may be mechanically fastened, for example, with rivets, to the spar 102 with the sleeve 214 positioned within the spar fastener hole 142. In another example, the nut plate 202 may be integrated into the spar 102. As an example, the nut plate 202 or a portion of the nut plate 202 (e.g., the body 208 of the nut plate 202) may be integrally molded into the spar 102. The nut 206 may then be placed within the interior chamber 224 formed by the integral dome 216. An insert, such as a threaded washer, may be placed over the integral nut plate 202 to serve as the rim 260 and to hold the nut 206 within the nut plate 202.

Figure 7:
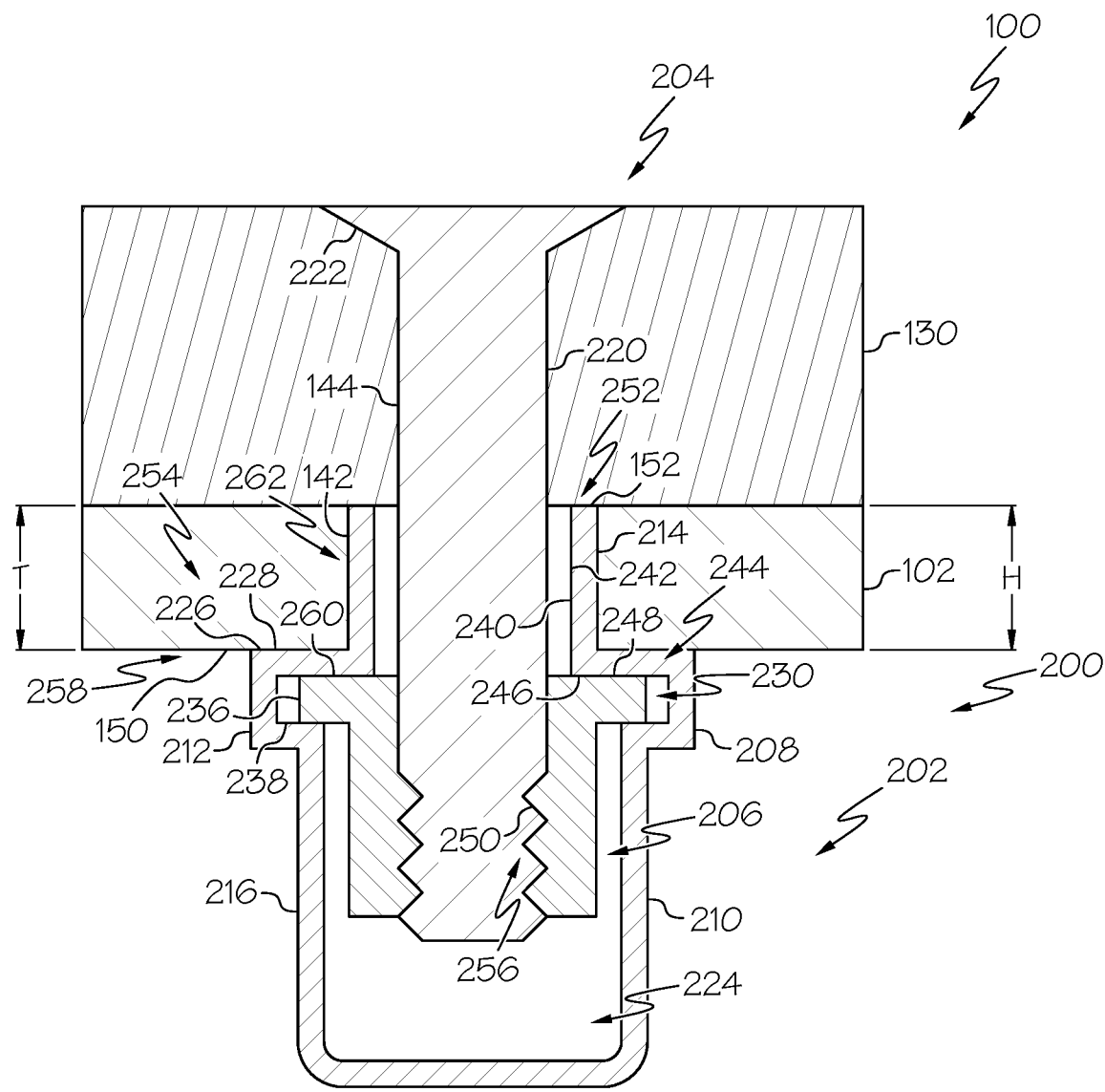
FIG. 7 is a schematic enlarged partial side elevation view, in section, of another embodiment of the disclosed wing and fastener system.

FIG. 7 is a schematic illustration of an enlarged partial cross-sectional view of another embodiment of the disclosed wing 100, such as in the form of the aircraft wing 1218 (FIG. 1), and the disclosed fastener system 200. In an exemplary embodiment, the fastener system 200 is an EME-protective fastener system.

The present disclosure recognizes that the disclosed fastener system 200 may provide for advantageous embodiments because use of the fastener system 200 to fasten the skin 130 to the spar 102 may reduce the cost, time and complexity of EME protection by eliminating the use of special EME fasteners, EME sealant and/or other EME protection devices.

In an example embodiment, the nut plate 202 includes a dielectric coating 240 on an interior surface 242 of the sleeve 214. The present disclosure recognizes that the disclosed fastener system 200 may provide for advantageous embodiments because the dielectric coating 240 provides EME protection by preventing arcing between the fastener 204 (e.g., the shank 220) and the nut plate 202 (e.g., the inner diameter surface 242 of the sleeve 214). As an example, the dielectric coating includes a solid film lubricant, such as those per SAE AS5272.

In an example embodiment, the nut plate 202 includes a conductive nut-to-flange interface 244 between the nut 206 and the body 208. The conductive nut-to-flange interface 244 establishes electrical connection between the nut 206 and the nut plate 202. As an example, the nut 206 includes a nut conductive contact surface 246 and the flange 212 includes a flange conductive contact surface 248 that define the conductive nut-to-flange interface 244. As an example, the nut conductive contact surface 246 is defined by one or more surfaces of the collar 236 and the flange conductive contact surface 248 is defined by one or more interior surfaces of the flange 212, for example, the rim 260, forming the nut receiving recess 230. In an example, the nut conductive contact surface 246 and the flange conductive contact surface 248 are both bare metal surfaces, such that the conductive nut-to-flange interface 244 is a metal-to-metal interface. The present disclosure recognizes that the disclosed fastener system 200 may provide for advantageous embodiments because the conductive nut-to-flange interface 244 provides EME protection by enabling an electrical connection between the nut 206 and the body 208 to allow current to flow therebetween without sparking.

In an example embodiment, a lubricant 250 is applied to the threaded fastener-to-nut interface 256 between the nut 206 and the threaded end portion of the shank 220. The present disclosure recognizes that the disclosed fastener system 200 may provide for advantageous embodiments because the lubricant 250 reduces friction to lower installation force and provides a more repeatable torque/tension relationship.

In an example embodiment, the dome 216 of the cover 210 of the nut plate 202 is configured to contain a buildup of pressure resulting from an EME, such as combustion resulting from a spark. In this example, the interior chamber 224 formed by the dome 216 of the cover 210 of the nut plate 202 includes a volume sufficient to accommodate expansion of gases, for example, due to combustion caused by an EME. As an example, the interior chamber 224 includes an overall volume that is at least approximately fifty percent larger than the volume of the portion of the interior chamber 224 occupied by the nut 206.

In the illustrated embodiment, the sleeve 214 includes a sleeve height H. In an example embodiment, the sleeve height H is approximately equal to a spar thickness T of the spar 102 (e.g., the chord 140) (FIG. 6). In this embodiment, an end of the sleeve 214 is placed in intimate contact with a portion of a first surface 152 of the skin 130, for example, proximate (e.g., at or near) a perimeter of the skin fastener hole 144, when the sleeve 214 is received within the spar fastener hole 142 and the skin 130 is placed in an assembly position relative to the spar 102 to fasten the skin 130 to the spar 102, for example, when the spar fastener hole 142 and the skin fastener hole 144 are approximately aligned to fasten the fastener 204 to the nut 206. In this embodiment, the surface 152 of the skin 130 and the end of the sleeve 214 define a sleeve-to-skin interface 255. The present disclosure recognizes that the disclosed fastener system 200 may provide for advantageous embodiments because intimate contact between the sleeve 214 and the surface 152 of the skin 130 at sleeve-to-skin interface 255 may provide EME protection by preventing the escape of high energy from within the interior chamber 224 of the cover 210 of the nut plate 202, for example, due to a buildup of pressure resulting from an EME. The present disclosure recognizes that the disclosed fastener system 200 may provide for advantageous embodiments because the intimate contact between the sleeve 214 the first surface 152 of the skin 130 provides EME protections by controlling (e.g., reducing or preventing) a gap being formed between the sleeve 214 and the skin 130, which may prevent sparking between the components.

In another example embodiment, the sleeve height H is less that the spar thickness T of the spar 102 (e.g., the chord 140) (FIG. 6). In this embodiment, the end of the sleeve 214 is spaced away from the first surface 152 of the skin 130, when the sleeve 214 is received within the spar fastener hole 142 and the skin 130 is placed in an assembly position relative to the spar 102 to fasten the skin 130 to the spar 102, for example, when the spar fastener hole 142 and the skin fastener hole 144 are approximately aligned to fasten the fastener 204 to the nut 206. In this embodiment, sleeve-to-skin interface 255 defines a gap (not explicitly illustrated).

In an example embodiment, one or more interfaces between the nut plate 202 and the spar 102 and/or the skin 130 include a fay seal 258. The fay seal 258 is a seal between a joint formed by opposed interfacing surfaces. As examples, the fay seal 258 may be applied to one or more of the flange-to-spar interface 254, the sleeve-to-skin interface 252, a sleeve to spar interface 262 and/or any other appropriate surface interfaces. As an example, after proper surface preparation, a sealant is applied uniformly to one of the mating surfaces of the surface interface, for example, at an approximate 10 mil thickness using any suitable application technique. The present disclosure recognizes that the disclosed fastener system 200 may provide for advantageous embodiments because fay seal 258 may provide EME protection by removing open spaces or gaps where water could be trapped, which may corrosion between components, and where current may cross, which may cause a spark.

In another example embodiment, the nut plate 202 is a unitary member or component, for example, the body 208 and the cover 210 forms a one-piece member. The nut 206 is disposed within the unitary nut plate 202 such that the collar 236 is positioned within the nut receiving recess 230 of the flange 212 and a portion of the nut 206 is positioned within the dome 216 of the cover 210. The present disclosure recognizes that the disclosed fastener system 200 may provide for advantageous embodiments because the unitary nut plate 202 may reduce potential sparking by minimizing joining interfaces and may provide improved EME protection, for example, to contain high energy resulting from an EME, since the nut plate 202 is sealed and there are no component interfaces or joints (e.g., crimp joints between the body 208 and the cover 210). Further, the unitary nut plate 202 provides an integral seal for the interior chamber 224, thus eliminated the need for secondary seal caps.

In an example embodiment, the nut plate 202 is made using an additive (e.g., additive layer) manufacturing process to form the one-piece member. In other words, the unitary nut plate 202 is an additively manufactured component. Additive manufacturing, also known at 3D printing, is consolidation process, using computer-aided manufacturing (CAM) technology, which is able to produce a functional complex part, layer-by-layer, without molds or dies. Typically, the process uses a powerful heat source, such as a laser beam or an electron beam, to melt a controlled amount of metal in the form of metallic powder or wire, which is then deposited, initially, on a base plate of a work piece. Subsequent layers are then built up upon each preceding layer. In other words, as opposed to conventional machining processes, additive manufacturing builds complete functional parts or, alternatively, builds features on existing components, by adding material rather than by removing it. In this example embodiment, the nut plate 202 is built layer-by-layer around the nut 206.

Examples of additive manufacturing techniques include: powder bed technologies such as Selective Laser Melting (SLM), where metal powder is melted by a laser beam and Electron Beam Melting (EBM), where metal powder is melted by an electron beam; blown powder technologies, also known as Laser Metal Deposition or Laser cladding, where the metal powder is blown coaxially to the laser beam, which melts the particles on a base metal to form a metallurgical bond when cooled; and Selective Laser Sintering, where metal powder is sintered by a laser beam As an example, a base plate may be mounted within a powder bed and the surface of the powder is leveled off so as to just cover the surface of the base plate. The laser may then be scanned over the base plate along a path, which defines a portion of the shape of the nut plate 202. Powder is melted to this shape and solidifies to a layer of metal on the base plate in the desired shape. The powder may then be re-leveled, slightly higher, and the process is repeated to define a continued portion of shape of the nut plate 202, for example, the dome 216 of the cover 210 and a portion of the flange 212 defining the interior shoulder 238. The nut 206 may then be placed within the interior chamber 224 formed by the dome 216 such that the collar 236 is supported by the interior shoulder 238 of the flange 212. The powder may then be re-leveled, slightly higher, and the process is repeated until the remaining portion of the shape of the nut plate has been fully formed, for example, the remaining portion of the flange 212 defining the exterior shoulder 226 and the sleeve 214.

Figure 8:
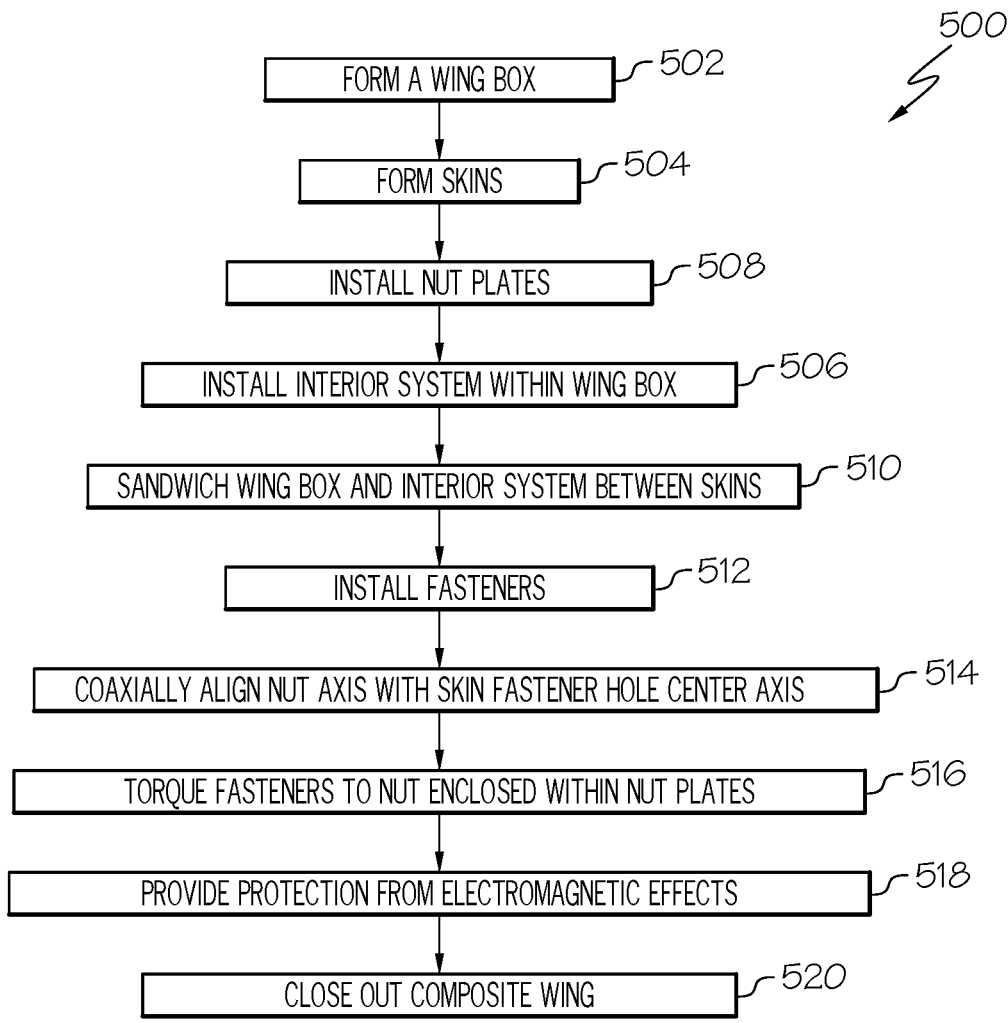
FIG. 8 is a flow diagram of one embodiment of the disclosed method for making a wing.

FIG. 8 is a flow diagram illustrating an exemplary embodiment of the disclosed method 500 for making the disclosed wing 100 (FIG. 4), such as in the form of the aircraft wing 1218 (FIG. 1).

In the illustrated embodiment, the method 500 includes the step of forming the wing box 132 (FIG. 3), as shown at block 502. As an example, the wing box 132 includes one or more spars 102 (FIG. 3) and the plurality of ribs 128 (FIG. 3) connected to the spars 102. The spars 102 include the plurality of spar fastener holes 142 (FIG. 5) formed (e.g., drilled or machined) therethrough. Each one of the spar fastener holes 142 includes the spar fastener hole diameter D4 (FIG. 5).

The method 500 also includes the step of forming the skins 130 (e.g., the upper skin 130*a* and the lower skin 130*b*) (FIG. 3), as shown at block 504. As an example, the skins 130 include the plurality of skin fastener holes 144 (FIG. 5) formed therethrough. Each one of the skin fastener holes 144 includes the skin fastener hole diameter D5 (FIG. 5). The spar fastener hole diameter D4 is larger than the skin fastener hole diameter D5.

The method 500 also includes the step of installing the nut plates 202 (FIG. 4) of the disclosed fastener system 200 (FIG. 4) within each one of the plurality of spar fastener holes 142 (FIG. 5), as shown at block 508. As an example, each one of the nut plates 202 includes the sleeve 214 (FIG. 4) configured to be received and retained within an associated one of the spar fastener holes 142, the flange 212 (FIG. 4) extending radially from the sleeve 214 and defining the nut receiving recess 230 (FIG. 4), a dome cover 210 (FIG. 4) extending axially from the flange 212 opposite the sleeve 214 and defining the interior chamber 224 (FIG. 4), and the nut 206 (FIG. 4) at least partially received within the nut receiving recess 230 and enclosed within the cover 210. The nut 206 is restricted from rotation within the nut plate 202 about the nut plate axis 218 (FIG. 4) and is free to move linearly within the nut plate orthogonal to the nut plate axis 218.

The method 500 also includes the step of installing one of more of the interior systems 136 (FIG. 3) within the wing box 132, as shown at block 506.

The method 500 also includes the step of sandwiching the wing box 132 (FIG. 3) and enclosing the interior system 136 (FIG. 3) between the skins 130 (FIG. 3), as shown at block 510. The skin fastener holes 144 (FIG. 5) are generally aligned with the spar fastener holes 142. The skin fastener hole center axis 148 (FIG. 6) of each one of the skin fastener holes 144 is not coaxially aligned with the spar fastener hole center axis 146 (FIG. 6) of each one of the spar fastener holes 142.

The method 500 also includes the step of installing the fasteners 204 (FIG. 4), as shown at block 512. The fasteners 204 are installed through each one of the skin fastener holes 144 (FIG. 5) and through the sleeve 214 (FIG. 4) of each one of the nut plates 202 (FIG. 4) received within associated ones of the spar fastener holes 142.

The method 500 also includes the step of coaxially aligning the nut axis 234 (FIG. 4) of the nut 206 (FIG. 4) with the skin fastener hole center axis 148 (FIG. 6), as shown at block 514. The nut axis 234 of the nut 206 is coaxially aligned with the skin fastener hole center axis 148 of the associated one of the skin fastener holes 144 (FIG. 6). Coaxial alignment of the nut axis 234 and the skin fastener hole center axis 148 is achieved by linearly moving the nut 206 within the nut plate 202 orthogonal to the nut plate axis 218 (FIG. 4) upon engagement with the fastener 204.

The method 500 also includes the step of torqueing (e.g., fastening) the fasteners 204 (FIG. 4) to the nut 206 enclosed within the associated nut plates 202 (FIG. 4), as shown at block 516. Torqueing the fasteners 204 to the nuts 206 enclosed within the nut plates 202 coupled to the spars 102 fastens the skins 130 to the spars 102.

The method 500 also includes the step of providing protection from EME, as shown at block 518. As an example, protection from EME is provided by the fastener system 200 by forming the electrically conductive nut-to-flange interface 244 (FIG. 7) between the flange conductive contact surface 248 (FIG. 7) of the nut 206 (FIG. 7) and the nut conductive contact surface 246 (FIG. 7) of the flange 212 (FIG. 7). As another example, protection from EME is provided by the fastener system 200 by applying the dielectric coating 240 (FIG. 7) to the inside diameter surface of the sleeve 214 (FIG. 7). As another example, protection from EME is provided by the fastener system 200 by sleeve height H (FIG. 7) of the sleeve 214 being approximately equal to the spar thickness T (FIG. 7) of the spar 102 (FIG. 7) to form the sleeve-to-skin interface 252 (FIG. 7). As another example, protection from EME is provided by the fastener system 200 by the dome 216 (FIG. 7) of the cover 210 (FIG. 7) forming the interior chamber 224 (FIG. 7) having a volume that is at least fifty percent greater than volume occupied by nut 206. As yet another example, protection from EME is provided by the fastener system 200 by body 208 (FIG. 7) and the cover 210 being integral to one another and forming a unitary nut plate 202; thus, sealing the interior chamber 224 and enclosing the nut 206 within the nut plate 202.

The method 500 also includes the step of closing out the wing 100 (FIG. 3), as shown at block 520. Close out of the wing 100 is achieved by using the skins 130 (FIG. 3) as the final close out panels of the wing 100.

Accordingly, the present disclosure recognizes that the disclosed wing 100 may provide for advantageous embodiments because utilizing the disclosed fastener system 200 to fasten the skins 130 to the wing box 132 may allow the skins 130 to define the final panel close out of the wing 100. The present disclosure also recognizes that the disclosed fastening system 200 may provide for advantageous embodiments because the nut plate 202 having the floating nut 206 may allow for determinate assembly of the wing 100, may eliminate the need for access doors or holes in the skins 130, may allow for pre-stuffed installation of the interior systems 136 and may enable thinner wing design. Further, the disclosed wing 100 utilizing the disclosed fastening system 200 may simplify EME architecture while complying with EME requirements for an aircraft, for example, by eliminating seal caps, eliminating fay seals, eliminating fillet seals, eliminating surface protection such as copper foil, dielectric tops, applique, etc. The present disclosure also recognizes that the disclosed wing 100 utilizing the disclosed fastening system 200 may provide for advantageous embodiments by reducing the time, complexity and cost associated with fixture assembly and match drilling.

Reference herein to "embodiment" means that one or more feature, structure, element, component or characteristic described in connection with the embodiment is included in at least one implementation of the disclosed invention. Thus, the phrase "one embodiment," "another embodiment," and similar language throughout the present disclosure may, but do not necessarily, refer to the same embodiment. Further, the subject matter characterizing any one embodiment may, but does not necessarily, include the subject matter characterizing any other embodiment.

Similarly, reference herein to "example" means that one or more feature, structure, element, component or characteristic described in connection with the example is included in at least one embodiment. Thus, the phrases "one example," "another example," and similar language throughout the present disclosure may, but do not necessarily, refer to the same example. Further, the subject matter characterizing any one example may, but does not necessarily, include the subject matter characterizing any other example.

Unless otherwise indicated, the terms "first," "second," etc. are used herein merely as labels, and are not intended to impose ordinal, positional, or hierarchical requirements on the items to which these terms refer. Moreover, reference to a "second" item does not require or preclude the existence of lower-numbered item (e.g., a "first" item) and/or a higher-numbered item (e.g., a "third" item).

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example and without limitation, two of item A, one of item B, and ten of item C; four of item B and seven of item C; or some other suitable combination.

In FIGS. 2 and 8, referred to above, the blocks may represent operations and/or portions thereof and lines connecting the various blocks do not imply any particular order or dependency of the operations or portions thereof. Blocks, if any, represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIGS. 2 and 8 and the accompanying disclosure describing the operations of the disclosed methods set forth herein should not be interpreted as necessarily determining a sequence in which the operations are to be performed. Rather, although one illustrative order is indicated, it is to be understood that the sequence of the operations may be modified when appropriate. Accordingly, modifications, additions and/or omissions may be made to the operations illustrated and certain operations may be performed in a different order or simultaneously. Additionally, those skilled in the art will appreciate that not all operations described need be performed.

Although various embodiments of the disclosed apparatus, system and method have been shown and described, modifications may occur to those skilled in the art upon reading the specification. The present application includes such modifications and is limited only by the scope of the claims.

What is claimed is:

1. A fastening system to fasten a skin that is abutted to a spar of a wing, said fastening system comprising:
  a threaded fastener configured to be received through a skin fastener hole in said skin having a skin fastener hole center axis;
  a nut plate configured to be coupled to said spar, wherein said nut plate has a nut plate center axis and comprises:
  a tubular sleeve extending along said nut plate center axis, wherein said tubular sleeve is configured to be located in a spar fastener hole of said spar having a spar fastener hole center axis to receive said threaded fastener;
  a flange outwardly extending from said tubular sleeve in a direction perpendicular to said nut plate center axis, wherein said flange comprises a first flange wall configured to abut said spar opposite said skin, a second flange wall opposite said first flange wall, and an interior recess formed between said first flange wall and said second flange wall; and
  a dome extending from said flange along said nut plate center axis opposite said sleeve, wherein said dome forms an interior chamber that is in volumetric communication with said interior recess of said flange; and
  a nut enclosed within said nut plate, wherein said nut has a nut center axis and comprises:
  a nut body located in said interior chamber of said dome and comprising a threaded bore configured to be threadably coupled with said threaded fastener; and
  a collar extending from said nut body in a direction perpendicular to said nut center axis, wherein a portion of said collar is located in said interior recess of said flange and is in contact with said first flange wall and said second flange wall,
  wherein said interior recess of said flange has an interior geometry that is complementary to an exterior geometry of said collar of said nut to prevent rotational movement of said nut about said nut center axis and to prevent linear movement of said nut along said nut plate center axis when said nut is threadably coupled to said threaded fastener and to enable linear movement of said nut perpendicular to said nut plate center axis when said skin fastener hole center axis is parallel but not colinear to said spar fastener hole central axis.

2. The fastening system of claim 1 wherein said sleeve, said flange, and said dome form a unitary nut plate.

3. The fastening system of claim 1 wherein linear movement of said nut perpendicular to said nut plate center axis coaxially aligns said nut axis with said skin fastener hole center axis of said skin fastener hole.

4. The fastening system of claim 1 wherein said nut plate further comprises a dielectric coating disposed on an inside diameter surface of said sleeve.

5. The fastening system of claim 4 wherein said dielectric coating comprises a solid film lubricant.

6. The fastening system of claim 1 wherein said interior chamber of said dome has a predetermined volume of at least fifty percent more than a volume occupied by said nut.

7. The fastening system of claim 1 wherein at least a portion of said first flange wall of said flange defines a flange conductive contact surface.

8. The fastening system of claim 7 wherein at least a portion of said collar defines a nut conductive contact surface.

9. The fastening system of claim 8 wherein said flange conductive contact surface and said nut conductive contact surface define an electrically conductive nut-to-flange interface.

10. The fastening system of claim 1 further comprising a lubricant between said threaded fastener and said nut.

11. The fastening system of claim 1 wherein said nut plate comprises a metallic material.

12. The fastening system of claim 1 wherein said nut plate comprises titanium.

13. A wing comprising the fastening system of claim 1.

14. The fastening system of claim 1 wherein said sleeve, said flange, and said dome form a monolithic nut plate.

15. The fastening system of claim 14, wherein:
  said monolithic nut plate is made by an additive manufacturing process; and
  said nut is located within said interior chamber of said dome during said additive-manufacturing process.

16. A fastening system comprising:
a threaded fastener having a fastener center axis;
a nut plate having a nut plate center axis and comprising:
- a tubular sleeve extending along said nut plate center axis and configured to receive said threaded fastener;
- a flange outwardly extending from said tubular sleeve in a direction perpendicular to said nut plate center axis, wherein said flange comprises a first flange wall, a second flange wall opposite said first flange wall, and an interior recess formed between said first flange wall and said second flange wall;
- a dome extending from said flange opposite said sleeve along said nut plate center axis, wherein said dome forms an interior chamber that is in volumetric communication with said interior recess of said flange; and a nut enclosed within said nut plate, wherein said nut has a nut center axis and comprises:
- a nut body located in said interior chamber of said dome and comprising a threaded bore configured to be threadably coupled with said threaded fastener; and
- a collar extending from said nut body in a direction perpendicular to said nut center axis, wherein:

a portion of said collar is located in said interior recess of said flange between and in contact with said first flange wall and said second flange wall; and said interior recess of said flange has an internal geometry that is complementary to an exterior geometry of said collar of said nut and is configured to:

prevent rotational movement of said nut about said nut center axis when said nut is threadably coupled to said threaded fastener;

prevent linear movement of said nut along said nut plate center axis when said nut is threadably coupled to said threaded fastener; and enable linear movement of said nut perpendicular to said nut plate center axis when said fastener center axis is parallel but not colinear to said nut plate center axis.

17. The fastening system of claim 16 wherein:
said sleeve, said flange, and said dome form a monolithic nut plate made by an additive manufacturing process; and
said nut is located within said interior chamber of said dome during said additive- manufacturing process.

18. The fastening system of claim 16 wherein:
said nut plate further comprises a dielectric coating disposed on an inside diameter surface of said sleeve;
at least a portion of said first flange wall of said flange is conductive; and
at least a portion of said collar in contact with said first flange wall is conductive.

19. The fastening system of claim 16 wherein said interior chamber of said dome has a predetermined volume of at least fifty percent more than a volume occupied by said nut.

20. The fastening system of claim 16 wherein said nut plate comprises titanium.

* * * * *